(12) United States Patent
Miklitarian et al.

(10) Patent No.: US 11,320,670 B2
(45) Date of Patent: May 3, 2022

(54) SPECTACLE FRAME HAVING TEMPLES WITH A MODIFIABLE CURVATURE AND WITH EXTENDED OPENING

(71) Applicants: Alain Miklitarian, Paris (FR); Dominique Delamour, Les Mesnuls (FR); Richard Chene, Neuilly (FR)

(72) Inventors: Alain Miklitarian, Paris (FR); Dominique Delamour, Les Mesnuls (FR); Richard Chene, Neuilly (FR)

( * ) Notice: Subject to any disclaimer, the term of this patent is extended or adjusted under 35 U.S.C. 154(b) by 140 days.

(21) Appl. No.: 16/613,713

(22) PCT Filed: May 8, 2018

(86) PCT No.: PCT/EP2018/061891
§ 371 (c)(1),
(2) Date: Dec. 4, 2019

(87) PCT Pub. No.: WO2018/210639
PCT Pub. Date: Nov. 22, 2018

(65) Prior Publication Data
US 2020/0142215 A1 May 7, 2020

(30) Foreign Application Priority Data
May 17, 2017 (BE) .................................... 2017/5364

(51) Int. Cl.
*G02C 5/20* (2006.01)

(52) U.S. Cl.
CPC ...................................... *G02C 5/20* (2013.01)

(58) Field of Classification Search
CPC ........ G02C 5/20; G02C 5/143; G02C 5/2263; G02C 3/003; G02C 2200/18;
(Continued)

(56) References Cited

U.S. PATENT DOCUMENTS

| 3,713,731 A | * | 1/1973 | Gardner | G02C 5/2263 |
| | | | | 351/113 |
| 4,377,327 A | * | 3/1983 | Zomer | G02C 5/16 |
| | | | | 351/113 |

(Continued)

FOREIGN PATENT DOCUMENTS

| EP | 0698801 A1 | 2/1996 |
| JP | H04 42628 U | 4/1992 |

(Continued)

OTHER PUBLICATIONS

Search Report from Belgium Intellectual Property Office on corresponding BE application (BE201705364) dated Jan. 19, 2018.

(Continued)

*Primary Examiner* — William R Alexander
*Assistant Examiner* — Sharrief I Broome
(74) *Attorney, Agent, or Firm* — Klein, O'Neill & Singh, LLP

(57) ABSTRACT

The spectacle frame has a front face, with two lateral stubs, and two temples which each extend from a front end, arranged against one of the front-face stubs, to a free rear end, each temple having on the inside a rod whose front end is immobilized at the front end of the temple, the temple having driving and shaping means for driving the movable rear end of the rod by displacement in the free rear end of the temple and for thus modifying the curvature of the temple. The front end of the rod is connected to the front-face stub against which is arranged the front end of the temple, inside of which the rod extends.

19 Claims, 4 Drawing Sheets

(58) Field of Classification Search
CPC ...... G02C 2200/08; G02C 5/146; G02C 5/10; G02C 5/16; G02C 2200/10; G02C 2200/16; G02C 5/006; G02C 11/00; G02C 5/08; G02C 2200/02; G02C 11/12; G02C 1/08; G02C 2200/06; G02C 2200/22; G02C 3/006; A61F 9/025; A61F 9/026; A61F 9/027; A61F 9/02; A61F 9/029; A61F 11/12; A61F 11/14
See application file for complete search history.

(56) References Cited

U.S. PATENT DOCUMENTS

| | | | | |
|---|---|---|---|---|
| 4,781,450 A | * | 11/1988 | Danloup | G02C 5/00 351/114 |
| 2009/0174861 A1 | * | 7/2009 | Perie | G02C 5/2254 351/110 |
| 2013/0235329 A1 | * | 9/2013 | Chene | G02C 5/20 351/121 |

FOREIGN PATENT DOCUMENTS

| WO | WO 2012/004406 A1 | 1/2012 |
|---|---|---|
| WO | WO 2013/064469 A1 | 5/2013 |

OTHER PUBLICATIONS

International Search Report and Written Opinion on corresponding PCT application (PCT/EP2018/061891) from International Searching Authority (EPO) dated Jun. 26, 2018.

* cited by examiner

SPECTACLE FRAME HAVING TEMPLES WITH A MODIFIABLE CURVATURE AND WITH EXTENDED OPENING

The invention concerns a spectacle frame comprising a front face, with two lateral tenons, and two arms, each extending from a front end, arranged against one of the front-face tenons, to a free rear end.

BACKGROUND

In general terms an arm is connected, to the associated front-face tenon, by a hinge attached to the arm and to the tenon.

From French patent FR 2 962 559, a frame is known each arm of which comprises inside it a rod the front end of which is immobilised at the front end of the arm, where the arm comprises moving and shaping means, to make the movable rear end of the rod move in the free rear end of the arm, and by this means to modify the curvature of the arm.

Since by this means it is possible to modify at will, and reversibly, the curvature of the spectacle frame arms, by shortening the rod relative to the arm inside which it extends, the frames can be correctly modified to fit the heads of the users, and by this means their comfort can be improved.

Another comfort-related element, for the users of spectacle frames, is to be able to separate their arms beyond their relative positions of use, in order to be able to engage them and place them on the user's head more easily. The term "extended opening" of frame arms is used.

SUMMARY

The problem which the applicant sought to address was to devise an extended opening with the spectacle frame with arm with modifiable curvature of the prior art defined above, which is simple and uncomplicated to implement.

The present application thus concerns a spectacle frame comprising a front face, with two lateral tenons, and two arms each extending from a front end, arranged against one of the front face tenons, to a free rear end, where each arm comprises within it a rod the front end of which is immobilised at the front end of the arm, where the arm comprises moving and shaping means, to make the movable rear end of the rod move in the free rear end of the arm, and by this means to modify the curvature of the arm, where this frame is characterised by the fact that the front end of the rod is connected to the front-face tenon against which is positioned the front end of the arm inside which the rod extends.

In a first implementation of the frame of the invention, the front end of the rod is attached directly to the front-face tenon against which the front end of the arm is positioned.

In such an implementation, there is no hinge attached to the arm and to the associated tenon of the front face. The hinge is advantageously eliminated.

Extended opening and return to the position of use are obtained by shortening or lengthening the rod, when its effective length is modified, and therefore when the curvature of the arm is modified, which cause a spring effect, which can moreover be accentuated if the arm is made of plastic and/or if the rod is made of a spring material, meaning that the arm and/or the rod therefore has/have what may be qualified as a "memory effect".

It will be noted that with a frame with hinges attached to the arms and to the front-face tenons, extended opening can be obtained only if the hinges are spring hinges. The invention of the present application is therefore of interest, in any event, since it does not require spring hinges.

In a variant implementation of the frame of the invention, there is however a hinge between the arm and the associated front-face tenon, but the hinge is attached only to the front-face tenon, and is floatingly mounted in a reception recess made in the front end of the arm, where the front end of the rod is attached to the hinge, and is therefore attached to the front-face tenon indirectly, through the hinge.

Again, however, there is no spring in the area of the front end of the arm. Extended opening is obtained in the same way as with a frame without a hinge; when extended opening occurs, the front end of the arm, which is pushed against its associated tenon, "rolls" around the tenon.

In the frame of the invention, the rear end of the moving movable rod is threaded, such that it can cooperate with a tapped sleeve of the moving and shaping means, which also comprise a drive wheel to make the sleeve rotate.

As a variant, the free rear end of the arm comprises a rotating endpiece installed against a main arm portion, screwed on to the threaded rear end of the rod to make it move into the endpiece, and to make the rod move into the main arm portion, and by this means to modify its effective length in order to modify the curvature of this main arm portion.

To resolve the problem of extended opening of the arms with modifiable curvature, which is simple and uncomplicated to implement, another solution can be proposed which is related to the previous one presented above specifically by this very same problem.

Another aim of the present invention is thus to protect a spectacle frame comprising a front face, with two lateral tenons, and two arms each extending from a front end, arranged against one of the front-face tenons, to a free rear end, where each arm comprises, inside it, a core comprising a front portion, with a front end attached to the front-face tenon against which the arm and a rear end are positioned, and a rear portion, with a movable front end moving in the arm, and a rear end attached in the free rear end of the arm, where the arm comprises moving and shaping means, to make the front end of the rear core part move relatively in the arm, and by this means to modify the effective length of the core and therefore the curvature of the arm.

In this latter frame of the invention it will be stressed that there is also no spring in the area of the front end of the arm.

In a first implementation of this latter frame, the front portion of the core comprises a pin, the front end of the rear portion of the core is threaded, and installed to cooperate with a tapped sleeve of the moving and shaping means, which also comprise a drive wheel to rotate the sleeve in which the pin is held freely.

In a second implementation, the rear end of the front portion of the core is threaded with a first pitch and the front end of the rear portion of the core is also threaded with a second pitch, the two pitches being reverse pitches, and where the two rear and front ends are installed to cooperate with a tapped sleeve, also with two reverse pitches, and where moving and shaping means also comprise a drive wheel to rotate the sleeve to modify the effective length of the core and the curvature of the arm.

It will be noted that with the implementation with the tapped sleeve with two reverse pitches to move in opposite directions the rear end of the front portion of the core and the front end of the rear portion of the core, the curvature of the arm is modified more simply and more rapidly than with the implementation with a sleeve tapped with a single pitch.

BRIEF DESCRIPTION OF THE DRAWINGS

The invention will be better understood with the assistance of the following description of several implementations of spectacle frames of the invention, with reference to the appended drawing, in which.

DETAILED DESCRIPTION OF THE INVENTION

Figure 1:
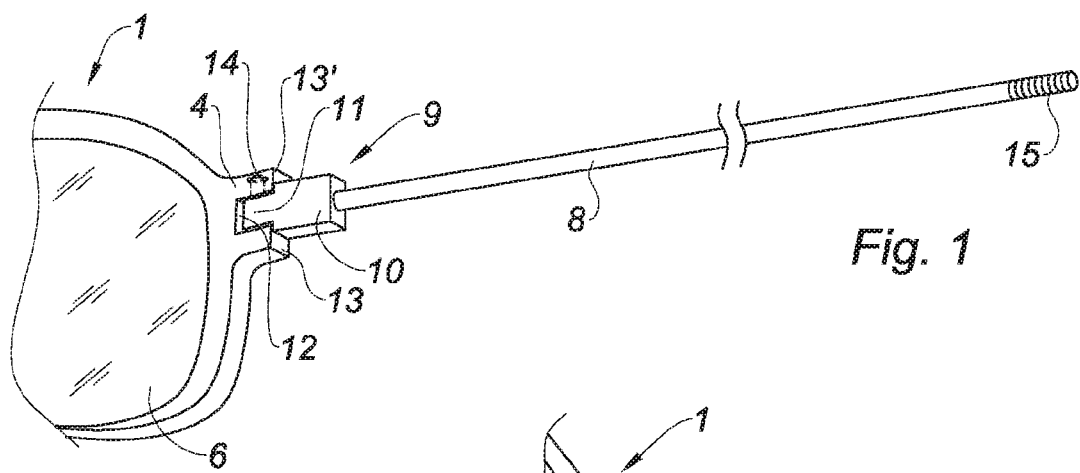
FIG. 1 is a partial perspective view, from inside, of the front face and of the rod of the right arm of a first implementation of the frame of the invention.
Figure 2:
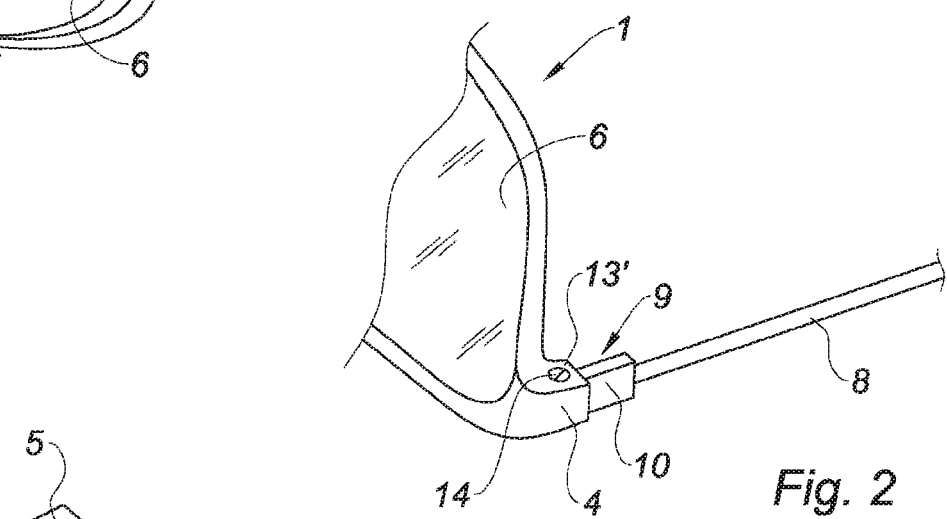
FIG. 2 is a partial perspective view, from outside, of the front face and of the rod of an arm of FIG. 1.
Figure 4:
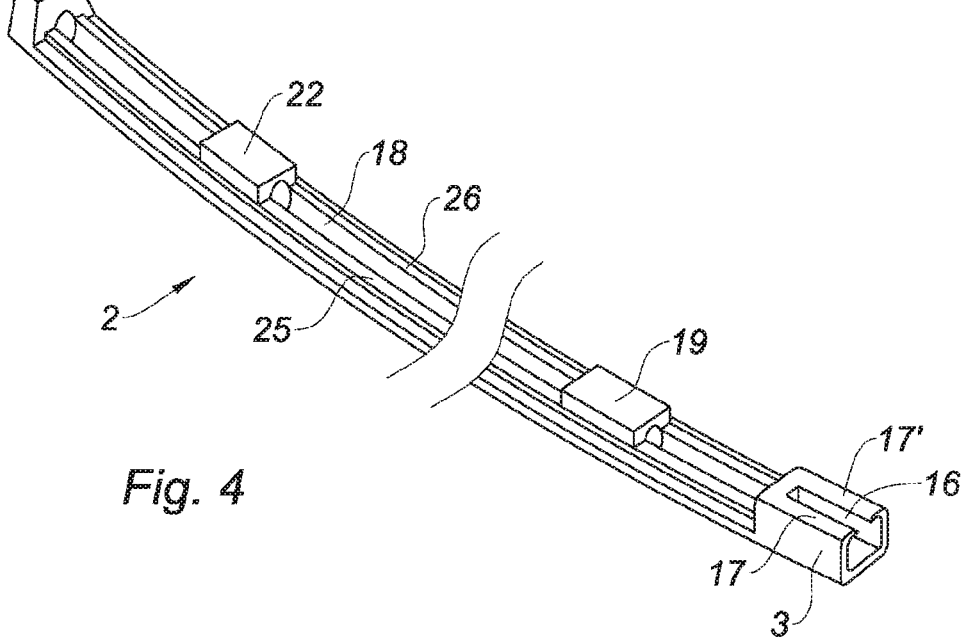
FIG. 4 is a partial perspective view from above of the arm of FIG. 3.
Figure 3:
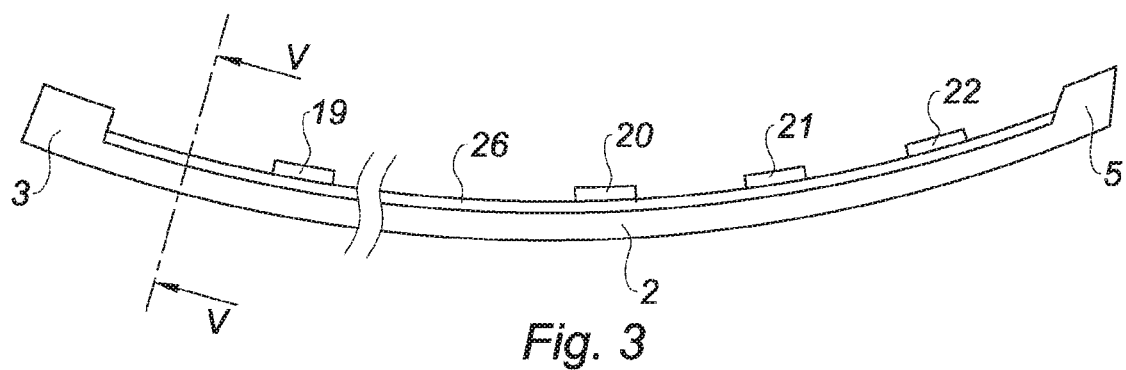
FIG. 3 is a view from the outer side of the right arm of the frame of FIGS. 1 and 2.

The spectacle frame of the invention comprises, with reference to FIGS. 1-4, a front face 1, intended to receive lenses 6 which are generally ophthalmic, and two right and left arms 2 (FIGS. 3, 4). Front face 1 is extended laterally, roughly at right angle, by two lateral front face tenons 4 intended to receive arms 2 in a manner described below.

Figure 8:
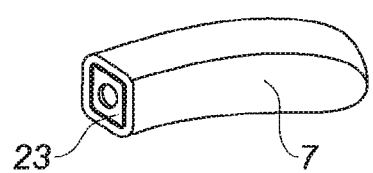
FIG. 8 is a perspective view of the rotating endpiece of the arm of FIGS. 3 and 4.

With reference to FIGS. 3, 4, which represent an arm 2 detached from frame 1, arm 2 extends from a front end 3, intended to be positioned against a tenon 4, to a free rear end 5, intended to be extended in this case by a rotating endpiece 7 (FIG. 8).

Rotating endpiece 7, which is an integral part of the arm, extends the principal arm portion extending between its two ends 3, 5.

When the frame has been installed, a wire rod 8, which can also be qualified as a core, extends inside each arm 2. The front end of rod 8 is immobilised in the area of front end 3 of arm 2. More specifically, in the implementation of FIGS. 1-4, front end 9 of rod 8 is directly connected to front face tenon 4 against which, when installed, front end 3 of arm 2 is positioned. This front end 9 of rod 8 in this case comprises a pin 10, to which the wire element of rod 8 is attached—preferably by welding—extended by an eyelet 11 for attaching rod 8 to tenon 4. Tenon 4, to this end, comprises a recess 12 to receive eyelet 11, with two flanges 13, 13', each drilled with a through hole, one of which is threaded to receive an attachment screw (or pin) 14, which is also countersunk through eyelet 11 positioned between the two flanges 13. Rod 8, which is connected to tenon 4, can thus swivel around screw 14.

Rear end 15 (FIG. 1) of rod 8, in the installed state of the frame, is thus able to move in rear end 5 of arm 2. In this case, this is due to the fact that end 15 of rod 8 is threaded so that it can cooperate with rotating endpiece 7 screwed on to rear end 15 of rod 8 and pressed against the rear end of arm 5. Endpiece 7 is screwed on to rod 8 through a screw-on plate 23 embedded in the endpiece.

It will have been understood that after rod 8 is attached to front face 1, to continue installation of the frame, arm 2 is put on to rod 8 until its front end 3 is pressing against associated tenon 4, and until threaded rear end 15 of rod 8 emerges from the rear end of arm 5 before rotating endpiece 7 is screwed on to this threaded rod end 15, until the endpiece is pressing against the rear end of the arm.

The reason for threading the rear end of rod 15, and for the presence of rotating endpiece 7, will be developed below.

Front end 3 of arm 2 is designed to cover end pin 10 of rod and thus press against its associated tenon 4. This front end 3 is widened to make a housing 16, which is in this case parallelepipedic, designed to receive rod end pin 10. Again, in this case, this housing 16 opens on to the interior of the arm, such that it presents only two inner lateral lips 17, 17' for holding the arm on the pin.

Threaded rear end 15 of rod 8 and rotating endpiece 7 are elements of means to modify the curvature of arm 2.

The wire portion of rod 8, when the frame is in the installed state, extends in a central open channel 18 of arm 2, and therefore between the two ends 3, 5 of the arm.

Rod 8, along channel 18, passes under bridges for shaping the arm, of which there are four such (19-22) in this case. Rod 8, which is immobilised at the front by tenon 4, and screwed in the rear into endpiece 7, can thus, when endpiece 7 is screwed on to rod 8, be shortened in terms of its effective length between the two ends 3, 5 of arm 2, by moving its rear end 15 in rear end 5 of the arm. Due to bridges 19-22, rod 8 remains in its channel 18, but due to its variation of effective length, the bridges approach one another in pairs relative to one another, which causes a shaping, or a deformation, of arm 2 which becomes curved or more curved (when the endpiece is screwed in).

Threaded rear end 15 of rod 8, rotating endpiece 7 and bridges 19-22 thus form a moving and shaping assembly to move threaded rear end 15 of rod 8 into free rear end 5 of arm 2, and therefore to modify the curvature of the arm.

It will be stressed that the frame which has just been described has no hinge. Extended opening of the arms and their return to the in-use position are obtained thanks to the modification of the effective length of the rod between its attachment to the tenon and the screw-in plate of the rotating endpiece, and therefore to the modification of the curvature of the arms, which cause a spring effect, or in other words, thanks to the memory effect of the arms and of their rod, in particular if the arms are made of plastic, and their rod is made of a spring material. When an arm is subjected to extended opening, its front end 3 rolls around its associated tenon 4.

The effective length of the rod, in the frame of FIGS. 1-8, can be modified using rotating endpiece 7, which is shaped like a banana, and easy to grasp with several fingers.

Figure 9:
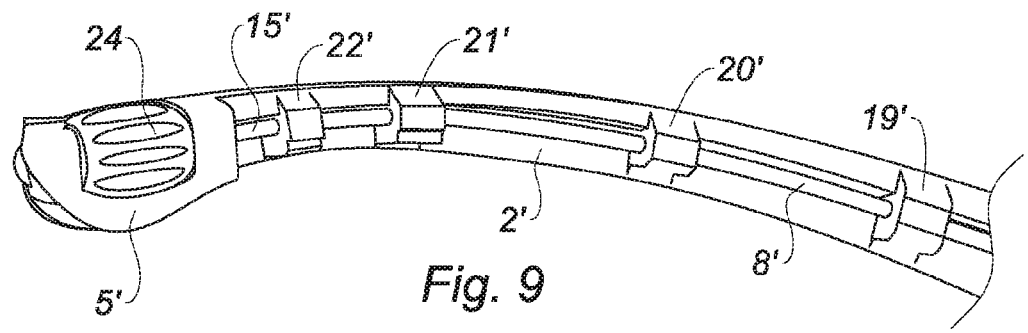
FIG. 9 is a perspective view of the inner side of the rear portion of an arm of a second implementation of the frame of the invention.

It is possible to envisage arms 2' of a frame of the invention, with reference to FIG. 9, with a free rear end 5' comprising a tapped sleeve held in a drive wheel 24 intended to rotate the sleeve, while rear end 15' of rod 8' is still threaded and screwed into the sleeve. When the sleeve is rotated, it causes rod 8', by its threaded rear end 5', to slide through it and the wheel.

In arm 2' of FIG. 9, shaping bridges 19'-22' are also represented.

To complete the description of the spectacle frame of the invention, each spectacle arm 2 comprises an internal cover covering rod 8, which is clipped on to the arm and covers rod 8 between its two ends 3, 5 and, in this case, with its free rear end moving relative to the arm. The cover and the arm are installed such that the cover can slide on the arm. Such a cover is described in patent application BE 2017/5104.

Figure 5:
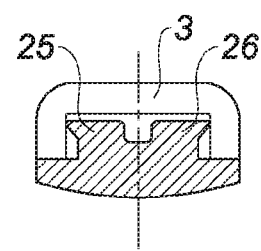
FIG. 5 is a cross-section view along line V-V of the arm of FIG. 3.
Figure 6:
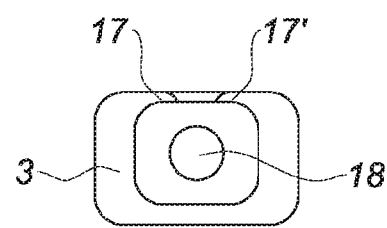
FIG. 6 is a cross-sectional and end view of the front end of the arm of FIG. 4.
Figure 7:
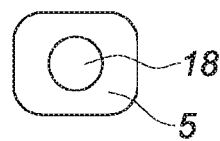
FIG. 7 is a cross-sectional and end view of the rear end of the arm of FIG. 4.

The cover comprises slots into which shaping bridges 19-22 fit with clearance. Each arm 2 comprises, on the inner side, lateral lips 25, 26 extending along the edges of the arm, over which curved lateral edges of the cover can slide (FIGS. 3-5).

Figure 10:
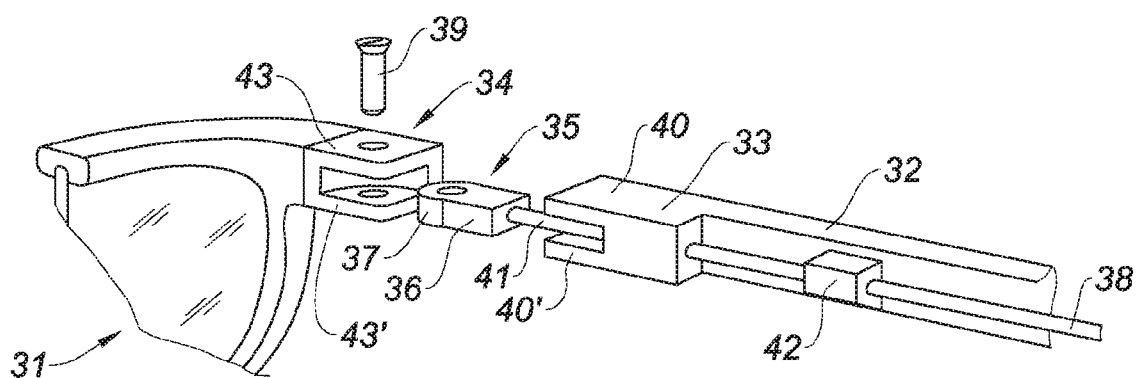
FIG. 10 is an exploded perspective view of a third implementation of the frame of the invention, with indirect attachment of the rod to the tenon of the front face.

The variant implementation of the frame of FIG. 10 is distinguished from the implementations of FIGS. 1-9 by front end 33 of the arm (in this case the right-hand one) 32, front-face tenon 34 of frame 31 and the fact that rod 38 is attached to tenon 34.

Front end 33 is shaped as a housing to receive a hinge 35.

Hinge 35 comprises a rear pin 36 and a front eyelet 37 which slides in tenon 34, between two flanges 43, 43', to which tenon it is attached by a screw, or pin, 39. For the hinge to be able to swivel around screw 39 by a hinge eyelet 37, and for arm 32 to be able to be folded back against front face 31, the recess to receive the hinge eyelet of the tenon is open towards the inside of the frame.

Rear pin 36 of hinge 35 is held in front end 33 of the arm, which is shaped as a housing, with two flanges 40, 40', which are also open towards the inside in order to enable the hinge to move there.

Front end 41 of rod 38 is attached to pin 36 of hinge 35, in this case by welding.

Unlike with the first implementations described above, frame 31 comprises a hinge 35 between arm 32 and its associated tenon 34, but it is attached only to tenon 34, and it is floatingly mounted in front end 33 of the arm. Front end 41 of rod 38 is therefore attached to tenon 34 indirectly through hinge 35.

It is of interest that the frame, although it comprises hinges, comprises no spring.

The arms of frame 31 can comprise a rotating end 7 or an adjustment wheel 24 with a tapped sleeve, as described above. Similarly, arm 32 of frame 31 also comprises shaping bridges (a bridge 42 is represented in FIG. 10) together with an inner cover covering rod 38.

Figure 11:
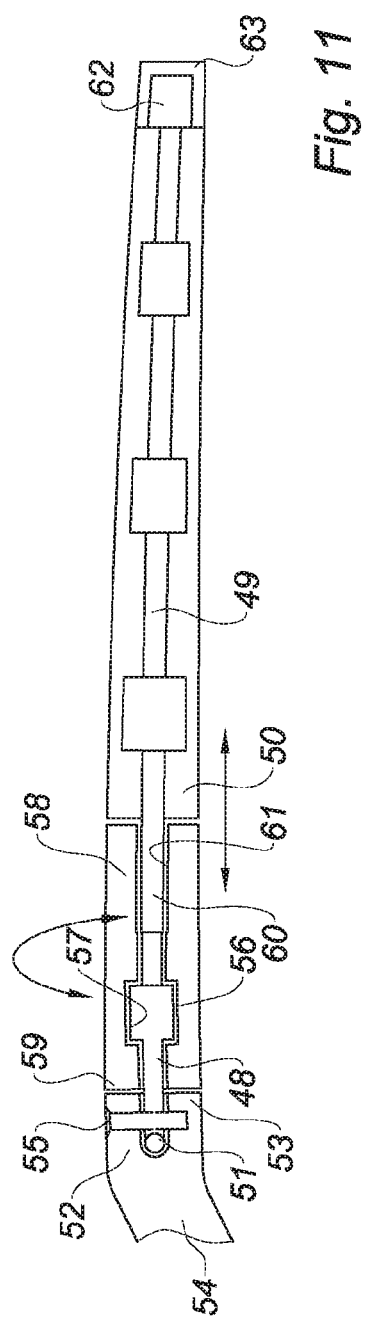
FIG. 11 is an internal view of a fourth implementation of the frame of the invention.

The implementation of the frame of FIG. 11, which resolves the same problem as the previous implementations, namely extended opening without spring of the arms with modifiable curvature, comprises a core comprising a front portion 48 and a rear portion 49, extending in an arm 50. Front portion 48 comprises, in its front end, an eyelet 51 which is held between the two flanges 52, 53 of tenon 54 associated with arm 50, which is attached to and jointed with tenon 54 by a screw, or pin, 55 countersunk through flanges 52, 53 and eyelet 51.

Hinge eyelet 51 of front portion 48 of the core is extended to the rear by a pin 56 held freely in a recess 57 of a sleeve 58 which rotates in conjunction with a drive wheel.

Front end 59 of arm 50 is positioned against tenon 54.

Front end 60 of rear portion 49 of the core is positioned in a threaded rear housing 61 of sleeve 58. Rear end 62 of rear portion 49 of the core is attached in rear end 63 of arm 50.

Sleeve 58 and its wheel form a part which moves and shapes the arm, to modify the curvature of the arm which, when it is rotated by manually adjusting the wheel, moves threaded front end 60 of rear core portion 49 into the arm.

Arm 50 of FIG. 11 also comprises shaping bridges 64, 65, 66 and an inner cover covering core 48, 49.

Figure 12:
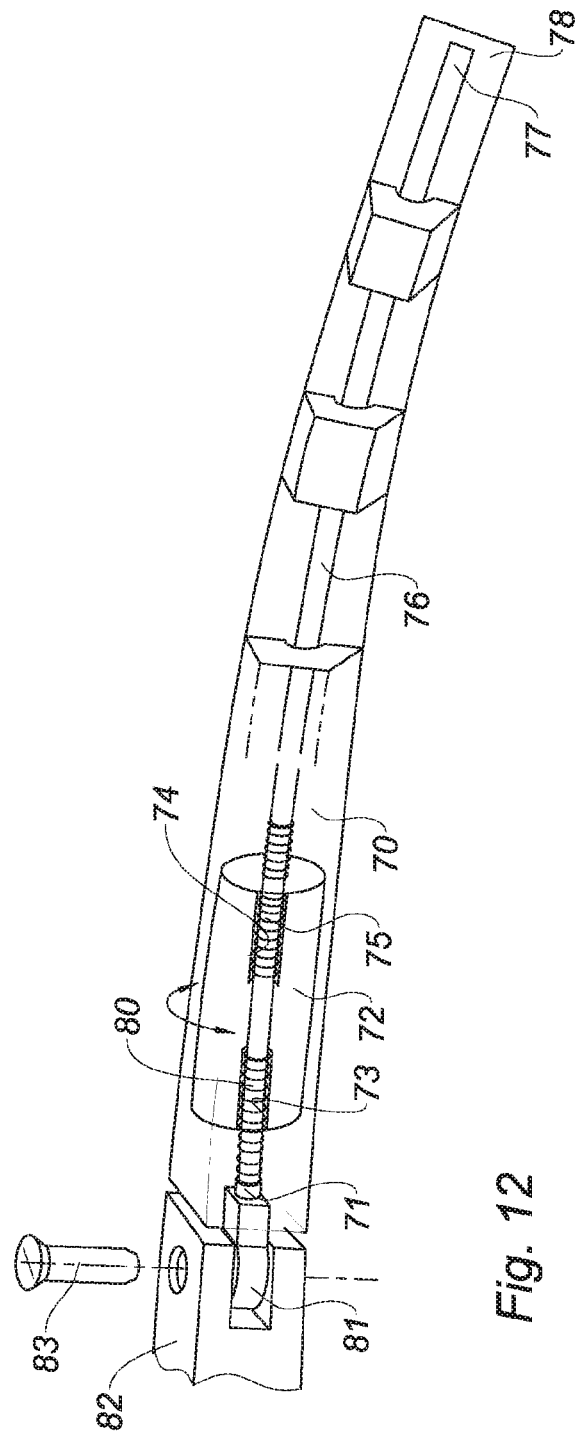
FIG. 12 is a perspective view of a fifth implementation of the frame of the invention.

The arm of frame 70 of FIG. 12 is very similar to that of FIG. 11, and is distinguished from it only by front portion 71 of the core, and moving and shaping sleeve 72.

Sleeve 72 comprises two threaded housings, a front housing 73 and a rear housing 74. Rear housing 74 receives front threaded end 75 of rear portion 76 of the core, rear end 77 of which is attached to rear end 78 of arm 70.

Front core portion 71 comprises a threaded rear end 80 received in front threaded housing 73 of sleeve 72.

This threaded rear end 80 is extended forwards by an eyelet 81 attached to the tenon of front face 82, associated with arm 70, which is positioned against it, in the same way as in the frame of FIG. 11, with a screw, or pin, 83.

Rear end 80 of front core portion 71 and front end 75 of rear core portion 76 are respectively threaded with two reverse pitches, as are the two pitches of the two threaded housings, front housing 73 and rear housing 74 of sleeve 72.

Sleeve 72 is associated with a rotating drive wheel.

Arm 70 of FIG. 12 also comprises shaping bridges 84, 85 and an inner cover covering core 71, 76.

The invention claimed is:

1. A spectacle frame comprising a front face with two lateral tenons and two arms;
    wherein each arm has a front end arranged against one of the two lateral tenons and each arm having a free rear end;
    wherein each arm comprises a rod and the rod having a front end and a rear end and the front end of the rod is immobilized at the front end of the arm;
    wherein each arm comprises a rotary endpiece and bridges that define a moving and shaping assembly, said moving and shaping assembly configured to make the rear end of the rod move in the free rear end of the arm and modify the curvature of the temple;
    wherein the front end of the rod is connected to one of the two lateral tenons and inside the arm; and
    wherein the rear end of the rod is threaded and the free rear end of the arm comprises a rotary endpiece installed against a main arm portion and the rotary endpiece is screwed to the rear end of the rod so that the rod is movable into the endpiece and to make the rod move into the main arm portion to modify an effective length and a curvature of the main arm portion.

2. The frame according to claim 1, wherein the front end of the rod is attached directly to one of the two lateral tenons against which the front end of the arm is positioned.

3. The frame according to claim 2, wherein the front end of the rod comprises a hinge eye.

4. The frame according to claim 1, wherein a hinge is attached to one of the two lateral tenons of the front face and is mounted floatingly in a reception recess made in the front end of the arm.

5. The frame according to claim 4, wherein the hinge comprises a hinge eyelet on one of the two lateral tenons.

6. The frame according to claim 1, in which the rear end of the rod is threaded, such that the rod can cooperate with the rotary endpiece.

7. A spectacle frame having a front face, with lateral tenons, and two arms each extending from a front end arranged against one of the front-face tenons, to a free rear end, where each arm comprises, inside it, a core with a front portion, with a front end attached to the front-face tenon against which the arm is positioned, and a rear end, and a rear portion, with a moving front end moving in the arm and a rear end attached in the free rear end of the arm, where the arm comprises moving and shaping rotary endpiece and bridges to make the front end of the rear core part move relatively in the arm, and by the rotary endpiece and bridges to modify the effective length of the core and therefore the curvature of the arm.

8. The frame according to claim 7, in which the front portion of the core comprises a pin, the front end of the rear portion of the core is threaded, and installed to cooperate with a tapped sleeve of the moving and shaping rotary endpiece, and also comprise a drive wheel to rotate the sleeve in which the pin is held freely.

9. The frame according to claim 8, in which the front portion of the core is hinged on the front-face tenon.

10. The frame according to claim 9, in which the rear end of the front portion of the core is threaded with a first pitch, and the front end of the rear portion of the core is also threaded, with a second pitch, the two pitches being reverse pitches, and where the two rear and front ends are installed to cooperate with a threaded sleeve, also with two reverse pitches, and where the moving and shaping rotary endpiece and bridges also comprise a drive wheel to rotate the sleeve to modify the effective length of the core and the curvature of the arm.

11. The frame according to claim 10, in which the front portion of the core is hinged on the front-face tenon.

12. The frame according to claim 1, the arm of which are made of plastic.

13. The frame according to claim 1, the rod of which is made of a spring material.

14. The frame according to claim 1, in which the moving and shaping means include pieces under which the rod passes.

15. A spectacle frame comprising a front face with two lateral tenons and two arms;
  wherein each arm has a front end arranged against one of the two lateral tenons and each arm has a free rear end and a core;
    wherein the core of each arm has a front portion and a rear portion, the front portion having a front end attached to one of the two lateral tenons against which the arm is positioned and the rear portion having a front end and a rear end, and wherein the front end of the front portion is movable in the arm and the rear end of the rear portion is attached in the free rear end of the arm; and
  wherein each arm comprises a rotary endpiece and bridges defining a moving and shaping assembly, said moving and shaping assembly configured to make the front end of the rear portion move and modify an effective length of the core and therefore a curvature of the arm.

16. The frame according to claim 15, wherein the front portion of the core comprises a pin, the front end of the rear portion is threaded to cooperate with a tapped sleeve of the moving and shaping assembly.

17. The frame according to claim 15, further comprising a drive wheel to rotate the tapered sleeve.

18. The frame according to claim 16, wherein the front portion of the core is hinged to one of the two lateral tenons.

19. The frame according to claim 15, wherein the rear end of the front portion of the core is threaded with a first pitch, and the front end of the rear portion of the core is threaded with a second pitch, the first and second pitches being different.

* * * * *